United States Patent

Kajiwara et al.

[11] Patent Number: 4,903,984
[45] Date of Patent: Feb. 27, 1990

[54] SUSPENSION DEVICE

[75] Inventors: Hajime Kajiwara; Masami Ogura, both of Saitama; Shoichi Sano; Masataka Kumata, both of Tokyo, all of Japan

[73] Assignee: Honda Giken Kogyo Kabushiki Kaisha, Tokyo, Japan

[21] Appl. No.: 193,823

[22] Filed: May 13, 1988

Related U.S. Application Data

[63] Continuation-in-part of Ser. No. 142,309, Dec. 29, 1987, Pat. No. 4,835,714, which is a continuation-in-part of Ser. No. 167,589, Mar. 14, 1988, Pat. No. 4,858,950, which is a continuation of Ser. No. 711,977, Mar. 14, 1985, abandoned.

[30] Foreign Application Priority Data

| May 15, 1987 | [JP] | Japan | 62-118381 |
| May 15, 1987 | [JP] | Japan | 62-118382 |
| May 20, 1987 | [JP] | Japan | 62-75737 |

[51] Int. Cl.⁴ .................................................. B60G 11/26
[52] U.S. Cl. ...................................... 280/712; 280/708; 280/714
[58] Field of Search ............... 280/710, 711, 709, 714, 280/708, 712, 686, 678, 680, 683

[56] References Cited

U.S. PATENT DOCUMENTS

| 3,140,083 | 7/1964 | Mahrle | 267/15 |
| 3,499,662 | 3/1970 | Mahrle | 280/124 |
| 4,354,693 | 10/1982 | Maeda et al. | 280/714 |
| 4,588,205 | 5/1986 | Gaiser | 280/714 |
| 4,589,675 | 5/1986 | Braun et al. | 280/714 |
| 4,619,467 | 10/1986 | Lafferty | 280/708 |

FOREIGN PATENT DOCUMENTS

| 265682 | 5/1988 | European Pat. Off. |
| 2541841 | 3/1977 | Fed. Rep. of Germany |
| 2722015 | 11/1978 | Fed. Rep. of Germany |
| 3004158 | 8/1981 | Fed. Rep. of Germany |
| 664698 | 9/1929 | France |
| 1483928 | 6/1967 | France |

Primary Examiner—Richard A. Bertsch
Attorney, Agent, or Firm—Irving M. Weiner; Joseph P. Carrier; Pamela S. Burt

[57] ABSTRACT

A suspension device in a motor vehicle has at least one component separate from a damper and to which vertical movement of a road wheel can be transmitted. The component comprises a resilient member supported on a vehicle body at a portion spaced from another portion operatively coupled to the road wheel, for giving vertical resiliency to the road wheel. The suspension device also has a counteracting load mechanism for applying a counteracting load which is variable dependent on an amount of flexing of a section of the component caused by vertical movement of the road wheel. The suspension device further includes a vehicle height adjusting mechanism operatively coupled to the counteracting load means for varying a static counteracting load of the counteracting load mechanism when the motor vehicle is at rest, to thereby vertically displace the section of the component for adjusting the height of the motor vehicle.

16 Claims, 4 Drawing Sheets

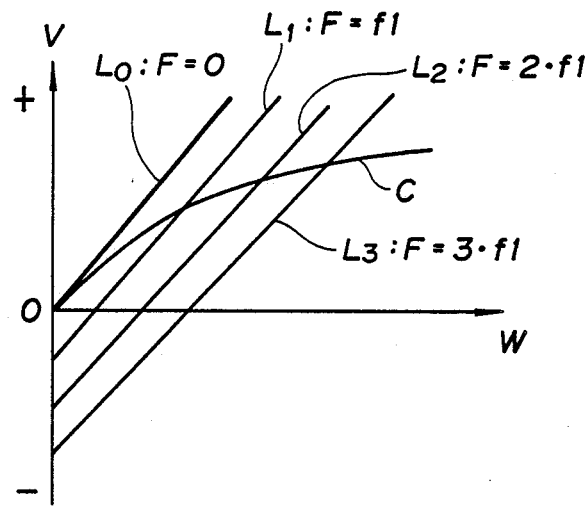
FIG. 5
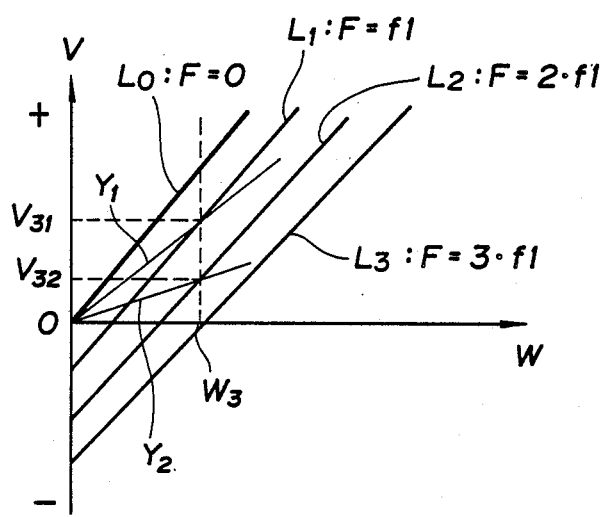
FIG. 6
FIG. 7
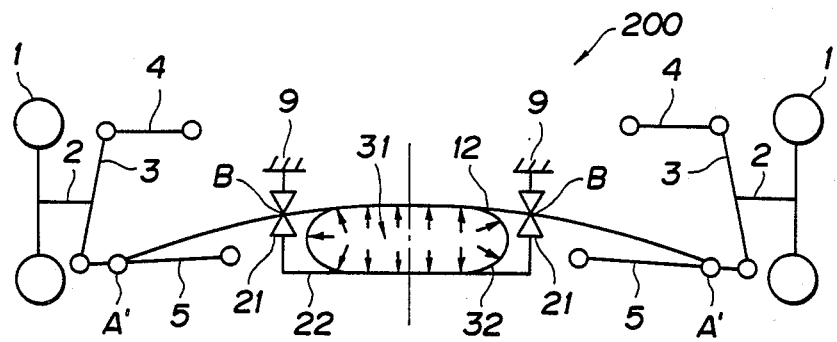

SUSPENSION DEVICE

This is a continuation-in-part of application Ser. No. 142,309, filed Dec. 29, 1987, now U.S. Pat. No. 4,835,714 which in turn is a continuation of application Ser. No. 711,977 filed Mar. 14, 1985 (now abandoned). This is also a continuation-in-part of application Ser. No. 167,589, filed Mar. 14, 1988, now U.S. Pat. No. 4,858,950.

BACKGROUND OF THE INVENTION

1. Field of the Invention

The present invention relates to a suspension device for use on a motor vehicle or the like.

2. Description of the Relevant Art

Most damper assemblies found in recent suspension devices for use on motor vehicles or the like comprise a combination of a hydraulic damper and a coil spring. The spring constant of some of these damper assemblies can be varied by adjusting the length of the spring. When the motor vehicle with such a damper assembly runs from a paved road into rough terrain, the spring constant of the damper assembly is varied for a harder suspension setting.

The coil spring is disposed around the hydraulic damper. Therefore, the diameter of the entire damper assembly is large. If such a damper assembly is incorporated in a double-wishbone suspension, the damper assembly tends to interfere with the upper arm of the suspension to a greater extent.

One solution to such interference would be to position a leaf spring, for example, separate from the damper, between the wheel and the vehicle body. The leaf spring would extend transversely of the vehicle body and have its outer end supporting the wheel and its inner end fixed to the vehicle body for giving the wheel vertical resiliency. Preferably, the spring constant of a damper assembly of this design should also be variable. This requirement could be met by employing a mechanism for shifting the point where the inner end of the leaf spring is attached to the vhicle body in the transverse direction of the vehicle body and then fixing the point for thereby adjusting the effective length of the leaf spring. Such a mechanism would however be highly complex.

The present invention has been made in an effort to solve in a simple practical manner the aforesaid problem of the conventional suspension device having a damper assembly comprising a coil spring and a damper.

SUMMARY OF THE INVENTION

It is an object of the present invention to provide a suspension device which includes a damper assembly having a spring separate from a damper and which can vary the spring constant of the damper assembly.

According to the present invention, the above object can be achieved by a suspension device in a motor vehicle having a road wheel and a vehicle body, comprising at least one component to which vertical movement of the road wheel can be transmitted, and counteracting load means for applying, to the component, a counteracting load which is variable dependent on the amount of vertical movement of the wheel component being separate from a damper, and comprises a resilient member having a portion operatively coupled to the road wheel, and supported on the vehicle body at a portion spaced from the portion for giving vertical resiliency to the road wheel. The component has a section which is flexible under an external force applied to the component from the road wheel in response to vertical movement of the road wheel, and the counteracting load means applies to the section, a counteracting load which is variable dependent on or proportional to an amount of flexing of the section.

The above and further objects, details and advantages of the present invention will become apparent from the following detailed description of preferred embodiments thereof, when read in conjunction with the accompanying drawings.

BRIEF DESCRIPTION OF THE DRAWINGS

FIGS. 5 and 6 are graphs showing the spring constant of the suspension device of FIG. 1;

FIG. 7 is a schematic front elevational view of a suspension device according to a second embodiment of the present invention;

DETAILED DESCRIPTION OF THE PREFERRED EMBODIMENTS

Figure 1:
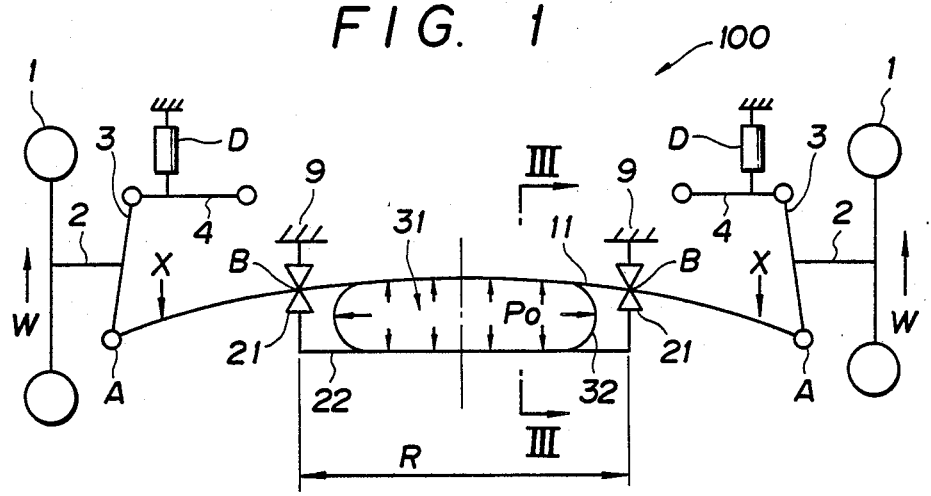
FIG. 1 is a schematic front elevational view of a suspension device according to a first embodiment of the present invention.

FIG. 1 shows a suspension device, generally denoted at 100, according to a first embodiment of the present invention, incorporated in a motor vehicle having two laterally spaced road wheels 1 each having an axle 2. The suspension device 100 is shown as comprising two double-wishbone suspensions each having an upper arm 4 on which the upper end of a knuckle 3 with the axle 2 rotatably supported thereon is pivotally supported, and a lower arm 11 on which the lower end of the knuckle 3 is pivotally supported at a point A. The lower arm 11 comprises an elongate leaf spring which is shared by the knuckles 3 associated with the two wheels 1, respectively. The leaf spring 11 has a vertical thickness for making the knuckles 3, i.e., the wheels 1 vertically resilient and a length or longitudinal axis extending in the transverse direction of the motor vehicle. The leaf spring 11 is of an arcuate shape, in its free state, which is slightly convex upwardly. The leaf spring 11 has an intermediate portion supported by support members 21 on a vehicle body 9 so as to be swingable and slidable in the transverse direction of the vehicle. The leaf spring 11 is supported at transversely symmetrical inner points B fixed to the vehicle body 9, with the knuckles 3 supported at the outer points A.

The suspensions have respective dampers D interposed between the upper arms 4 and the vehicle body 9.

The support members 21 are also supported on the vehicle body 9 by means of a support plate 22 mounted on the vehicle body 9. Between the support plate 22 and the intermediate portion of the leaf spring 11 extending between the inner supporting points B, there is disposed a counteracting load mechanism 31 for applying a counteracting load to the leaf spring 11 in a direction opposite to the external force imposed from the wheels 1 by a bump. The support plate 22 is in the form of a rectangular vat. In the illustrated embodiment, the counteracting load mechanism 31 is disposed underneath the supporting points B.

The counteracting load mechanism 31 comprises a bag or container 32 substantially in the shape of a rectangle as viewed in plan with its longer sides extending in the transverse direction of the vehicle, and a fluid filled in the container 32. The container 32 has its lower surface fixed to the support plate 22 against downward movement. In other words, the container 32 is held between the support 22 and the intermediate portion of the leaf spring 11 in an unconnected relation to at least one of the leaf springs and the support 22. For example, the container 32 is made of a nonexpandable flexible material, and the fluid filled in the container 32 is a compressible gas. Alternatively, the container 32 is made of an expandable material, and the fluid filled in the container 32 is a noncompressible liquid.

Figure 3:
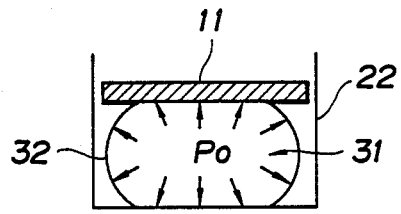
FIG. 3 is a cross-sectional view taken along line III—III of FIG. 1.

When the motor vehicle is at rest, the upper surface of the container 32 of the counteracting load mechanism 31 is held in contact with the lower surface of the leaf spring 11, but the counteracting load mechanism 31 is not compressed by the leaf spring 11. In this condition, a static counteracting load F0 applied to the leaf spring 11 under an initial fluid pressure P0 (FIGS. 1 and 3) in the container 32 is F0=0, and the wheels 1 are resiliently urged downwardly under the resiliency of the leaf spring 11.

Figure 2:
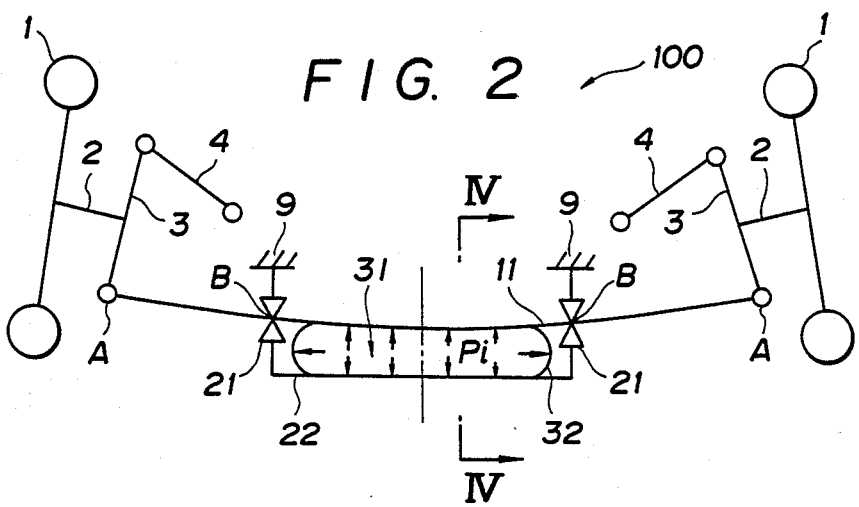
FIG. 2 is a schematic front elevational view of the suspension device of FIG. 1, showing the manner in which the suspension device operates when the wheels bump.
Figure 4:
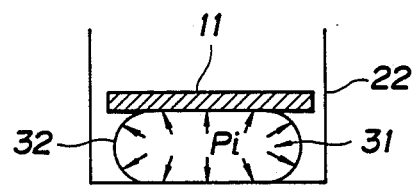
FIG. 4 is a cross-sectional view taken along line IV—IV of FIG. 2.

When an upward external force W is applied to the outer ends of the leaf spring 11 by the wheels 1, the opposite end portions and central portion of the leaf spring 11, which are divided by the supporting points B, are caused to flex upwardly and downwardly, respectively, and the wheels 1 are moved upwardly, as shown in FIG. 2. Since the central portion of the leaf spring 11 is deformed downwardly, the fluid in the container 32 is compressed by the leaf spring 11 to develop a fluid pressure buildup up to Pi (FIGS. 2 and 4). The fluid pressure P is progressively increased as the amount V by which the central portion of the leaf spring 11 is flexed downwardly is increased. In the range R between the supporting points B, the counteracting load F produced by the counteracting load mechanism 31 is applied as an equally distributed uniform bending stress as an equally uniform distributed load to the leaf spring 11.

If the counteracting load mechanism 31 were not existent, the amount V by which the central portion of the leaf spring 11 is flexed downwardly would be proportional to the magnitude of the upward external force W applied from the wheels 1. However, the pressure P of the fluid in the container 32 becomes progressively higher as the amount V of downward flexing of the leaf spring 11 increases, and the counteracting load Fi proportional to the pressure Pi acts on the leaf spring 11. As a result, the apparent spring constant K of the leaf spring 11 is continuously increased in proportion to the increase in the external force W. The apparent spring constant of the suspension device 100 is also increased in proportion to the increase in the external force W, resulting in a harder suspension setting.

The apparent spring constant K of the leaf spring 1 will be described below. Only the righthand suspension, shown on the righthand side of line III—III of FIG. 1, will be discussed. As shown in FIG. 1, the leaf spring 11 is shared by the two suspensions to provide a stabilizer function. It is also possible to provide the suspensions with respective leaf springs, and add a stabilizer separately from the leaf springs. Theoretically, the counteracting load mechanism may be arranged to apply a downward counteracting load to points X in FIG. 1 for obtaining the same operation and effects.

It is now assumed that an upward external force W is applied to the outer end of the leaf spring 11 from the righthand wheel 1, so that the suspension device reaches the position of FIG. 2. At this time, the counteracting load F from the counteracting load mechanism 31 and the amount V of downward flexing of the leaf spring 11 between the supporting points B are related to each other as follows:

$$V = (W/k) - a \cdot F \tag{1}$$

where k is the inherent spring constant of the leaf spring and a is a consant.

Therefore, two different amounts V1, V2 of downward flexing of the leaf spring 11 can be expressed by:

$$V1 = (W1/k) - a \cdot F1 \tag{2}$$

$$V2 = (W2/k) - a \cdot F2 \tag{2'}$$

By subtracting the equation (2) from the equation (2'), we get $$V2 - V1 = (1/k) \cdot (W2 - W1) - a \cdot (F2 - F1) \tag{3}$$

That is, $$dV = (dW/k) - a \cdot dF \tag{3'}$$

where dV, dW, dF are increases in the amount V of flexing, the upward external force W, and the counteracting load F.

The apparent spring constant K of the leaf spring 11 as it is continuously varied by the counteracting load mechanism 31 is expressed, in relation to the amount V of flexing and the upward external force W, by:

$$V = W/K \tag{4}$$

More precisely, the increases dV, dW of the amount V of flexing and the upward external force W are related as follows:

$$dV = dW/K \tag{4'}$$

Since the lefthand side of the equation (4') must be equal to the lefthand side of the equation (3'), the lefthand side of the equation (3') is replaced with the righthand side of the equation (4') to obtain:

$$dW/K = (dW/k) - a \cdot dF \quad (5)$$

By dividing both sides of the equation (5) by dW, we get $$1/K = (1/k) - a \cdot dF/dW \quad (5')$$

The equation (5') is solved for K as follows:

$$\begin{aligned} K &= k \cdot dW/(dW - a \cdot k \cdot dF) \\ &= k/(1 - a \cdot k \cdot dF/dW) \end{aligned} \quad (5'')$$

As described above, the value dF/dW is continuously increased in proportion to the increase in the external force W. Therefore, the term $a \cdot k \cdot dF/dW$ in the denominator of the equation (5'') is continuously increased in proportion to the increase in the external force W. As a consequence, the apparent spring constant K of the leaf spring 11 is increased in proportion to the increase in the external force W for a harder suspension setting.

FIG. 5 shows a characteristic curve C representing the relationship between the upward external force W exerted on the outer ends of the leaf spring 11 of the suspension device 100 and the amount V of downward flexing of the central portion of the leaf spring 11 between the supporting points B. The amount V of flexing is positive when the central portion of the leaf spring 11 flexes downwardly. The characteristic curve C indicates that the apparent spring constant K is continuously increased in proportion to the increase in the amount V of flexing due to the increase in the external force W.

By dividing both sides of the equation (3')

$$dV = (dW/k) - a \cdot dF \quad (3')$$

by dW, we obtain.

$$dV/dW = 1/k - a \cdot dF/dW \quad (3'')$$

By dividing both sides of the equation (4')

$$dV = dW/K \quad (4')$$

by dW, we obtain $$dV/dW = 1/K \quad (4'')$$

From the equations (4'') and (3''), the following equation is obtained:

$$dV/dW (=1/K) = 1/k - a \cdot dF/dW \quad (6)$$

dV/dW represents the gradient of a line tangential to the characteristic curve C. Since the term dF/dW is continuously increased in proportion to the increase in the external force W, the gradient dF/dW of the curve C is reduced in proportion to the increase in the external force W, and hence the reciprocal 1/K of the apparent spring constant K is continuously reduced in proportion to the increase in the external force W. This means that the apparent spring constant K is continuously increased in proportion to the increase in the external force W.

FIG. 5 also shows characteristic straight lines L0 (: F=0), L1 (: F=f1), L2 (: F=2·f1), and L3 (: F=3·f1) indicative of the relationship between the external force W and the amount V of flexing when F in the equation (1)

$$V = (W/k) - a \cdot F \quad (')$$

is fixed at 0 (zero), f1 (a prescribed load), 2·f1, and 3·f1, respectively. The first characteristic line L0 shows the relationship between V and W when the counteracting load mechanism 31 is not present. The gradient of the line L0 is equal to the reciprocal 1/K of the inherent spring constant k of the leaf spring 1. The characteristic lines L1, L2, L3 are obtained by attaching weights having weights f1, 2·f1, 3·f1 to the points X (FIG. 1). Since the respective magnitudes of the counteracting load F are constant, the gradients of the straight lines L1, L2, L3 are equal to the gradient of the straight line L0, i.e., the apparent spring constant K of the leaf spring 11 remains unchanged.

The foregoing explanation applies where the initial pressure P0 of the fluid in the counteracting load mechanism 31 is not regulated in any way after the counteracting load mechanism 31 has been installed. However, if the container is made of an expandable material and the fluid filled therein is a noncompressible liquid, and if a mechanism is provided for regulating the initial pressure of the fluid to make constant the rate of increase of the counteracting load F to the increase in the external force W, i.e., dF/dW, then it is possible to adjust the apparent spring consant K of the leaf spring 11 at a certain rate. Such a regulating mechanism should preferably comprise a liquid reservoir, a supply line connecting the liquid reservoir to the container, a pump disposed in the supply line, a check valve disposed in the supply line downstream of the pump, a solenoid valve capable of discharging the liquid from the container, and a controller for controlling the pump and the solenoid valve. With this arrangement, it is possible to establish the characteristics of the leaf spring 11 as indicated by straight lines Y1, Y2 in FIG. 6. The characteristic straight lines Y1, Y2 are selected such that when the external force W applied is of a value W3, the amount V of flexing is of values V31, V32 (V31 > V32), respectively. The gradient 1/K1 of the straight line Y1 and the gradient 1/K2 of the straight line Y2 are constant, as indicated by:

$$1/K1 = V31/W3 \quad (7)$$

$$1/K2 = V32/W3 \quad (8)$$

where K1, K2 are apparent spring constants when the leaf spring 11 has the characteristics Y1, Y2, respectively. Since V31>V32, 1/K1>1/K2 and hence K2>K1. Thus, the leaf spring 11 is harder when its characteristics is indicated by the line Y2 than when its characteristics is indicated by the line Y1.

Employing a counteracting load mechanism with its initial internal pressure regulatable for giving the characteristic straight line Y1 is functionally equivalent to providing coil springs of equal pitch between the leaf spring 11 and the vehicle body for varying or increasing the apparent spring constant K of the leaf spring 11 at a certain rate. It will be understood that by providing such a counteracting load mechanism, it is possible to provide an infinite number of characteristic straight lines passing through the origin and having different gradients in addition to the characteristic straight lines Y1, Y2. With the counteracting load mechanism of this type being incorporated, it is not necessary to use many coil springs of equal pitch, but it is possible to vary the apparent spring constant K of the leaf spring 11 as desired at a certain rate.

In the illustrated suspension device 100, the lower arm, which is one component thereof, comprises the leaf spring 11 which gives the wheels 1 vertical resiliency. Therefore, it is possible to provide dampers without any coil springs combined therewith. This allows the upper arms of the double-wishbone suspensions to be positioned with greater freedom.

As described above, the suspension 100 includes the counteracting load mechanism 31 for applying, to the leaf spring 11, the counteracting load F which is progressively increased dependent on the amount V of flexing of the leaf spring 11. Therefore, the apparent spring constant K of the leaf spring 11 is continuously increased in proportion to the increase in the external force W, thus providing desired damping characteristics. If the initial vertical width of the container 32 and the initial internal pressure P0 thereof are constant, then the counteracting load F generated by the counteracting load mechanism 31 dependent on the amount V of flexing of the leaf spring 11 is substantially proportional to the area of the container 32 as viewed in plan. Consequently, by increasing or reducing the area of the container 32 as viewed in plan, the characteristics with which the apparent spring constant K of the container 11 varies can be modified. Likewise, even if the area of the container 32 as viewed in plan is constant, the characteristics with which the apparent spring constant K of the container 11 varies can be modified by increasing or reducing the initial internal pressure P0 of the container 32.

By employing a counteracting load mechanism in which the rate at which the counteracting load F increases with an increase in the external force W, i.e., the value dF/dW is constant, the apparent spring constant K of the leaf spring 11 can be varied without using a number of leaf oil springs of equal pitch between the leaf spring 11 and the vehicle body 9.

Since the counteracting load mechanism 31 comprises the container 32 and the fluid filled therein, the counteracting load F is applied as an equally distributed uniform load, but not as a point load, to the leaf spring 11. Therefore, the counteracting load can be imposed on the leaf spring 11 while avoiding any stress concentration on the leaf spring 11. The counteracting load mechanism may be positioned anywhere insofar as long as it can apply the counteracting load to the leaf spring in a direction which counteracts the upward external force applied from the wheels.

The single leaf spring 11 serves as the lower arms of the laterally spaced suspensions. As a consequence, the leaf spring 11 functions as a stabilizer, and any stabilizer which would otherwise normally be provided separately from the suspension lower arms is not needed. Thus, the suspension device is small in size and lightweight. The single leaf spring 11 also permits the single counteracting load mechanism 31 to be shared by the laterally spaced suspensions.

The lower arms of the suspensions may be constructed as a component other than a leaf spring, but a leaf spring separate from the lower arms may be coupled to the lower arms, as will be described later with reference to a second embodiment. The upper arms of the suspensions may be constructed as a leaf spring, or a leaf spring separate from the upper arms may be coupled to the upper arms.

Even if the counteracting load mechanism 31 is dispensed with, dampers without any coil springs may be employed. The counteracting load mechanism comprising the container and th fluid filled therein, as described above, may be replaced with a coil spring of irregular pitch interposed between the leaf spring and the vehicle body.

A plurality of containers may be disposed on the support plate 22 at laterally spaced locations, and the fluid filled in the Containers may be of different initial pressure settings. According to this alternative, the apparent spring constants of the laterally spaced suspensions may be varied independently. Alternatively, a plurality of counteracting load mechanisms may be disposed on the leaf spring at appropriate positions.

The present invention is applicable to not only double-wishbone suspensions, but also any of various other suspension types such as strut suspensions. Although the leaf spring is supported on the vehicle body at the two symmetrical points B in the above embodiment, it may alternatively be supported at any other even number of symmetrical points, such as four points. Rather than a common leaf spring shared by two laterally spaced suspensions, a common leaf spring shared by two longitudinally spaced suspensions (i.e. front and rear wheel suspensions) on one side of the vehicle may be employed.

FIG. 7 schematically illustrates a suspension device 200 according to a second embodiment of the present invention. Those parts of FIG. 7, and also those of subsequent embodiments, which are identical to those of the suspension device 100 of the first embodiment are denoted by identical reference numerals, and will not be described in detail.

The suspension device 200 includes a single elongate leaf spring 12 separate from lower arms 5 of two laterally spaced suspensions. The leaf spring 12 has its opposite ends pivotally coupled to portions of the lower arms 5 at respective points A' which are symmetrically disposed in the transverse direction of the motor vehicle. Dampers without coil springs, which are disposed between the upper arms 4 and the motor vehicle body are omitted from illustration.

The suspension device 200 offers the same advantages as those of the suspension device 100 of the first embodiment except that the lower arms of the suspension inseams are constructed as provided separately from (or in addition to) the a single leaf spring 12 whereas the leaf spring is according to the first embodiment.

Figure 8:
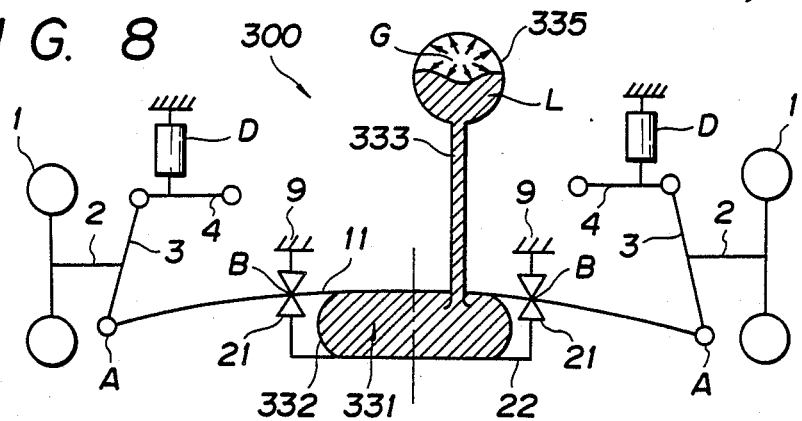
FIG. 8 is a schematic front elevational view of a suspension device according to a third embodiment of the present invention.

A suspension device 300 according to a third embodiment of the present invention is schematically shown in FIG. 8. The suspension device 300 includes a counteracting load mechanism 331 which comprises a bag or container 332 disposed between a leaf spring 11 and a support plate 22 and extending transversely of the vehicle, a subtank or auxiliary tank 335 mounted on the vehicle body, and a joint tube 333 through which the container 332 and the subtank 335 are held in fluid communication with each other. The container 332, the joint tube 333, and the subtank 335 are made of a nonexpandable flexible material, and filled with a noncompressible fluid L comprising a liquid. The subtank 335 is positioned upwardly of the container 332 and also filled with a compressible fluid G comprising a gas.

When the central portion of the leaf spring 11 is flexed downwardly, the volume of liquid L which is proportional to the amount V by which the leaf spring 11 is flexed is forced out of the container 332 through the joint tube 333 into the subtank 335, thus compressing the gas G therein. The pressure of the gas G is progressively increased as the amount V of flexing of the leaf spring 11 is increased. Therefore, the counteracting load mechanism 331 offers the same advantages as those of the counteracting load mechanism 31 shown in FIG. 1.

The counteracting load is generated by the subtank 335. Accordingly, the volume of the container 332 and hence the vertical thickness thereof under its initial condition are reduced as much as possible. Even if the container 332 is disposed beneath the leaf spring 11, therefore, the distance by which the support plate 22 is spaced downwardly from the vehicle body 9 is minimized, and the minimum height of the vehicle from ground is no largely affected by the support plate 22.

The joint tube 333 generates a certain degree of resistance to the flow of the liquid L therethrough. For this reason, the counteracting load mechanism 331 additionally provide a damper function, and the entire volume of the counteracting load mechanism 331 is reduced. The damping capability of the counteracting load mechanism 331 may be varied by changing the diameter of the joint tube 333.

The container 332, the joint tube 333, and the subtank 335 which are made of a nonexpandable flexible material may be filled only with a compressible fluid comprising a gas functions directly as the lower arms of the suspensions.

Figure 9:
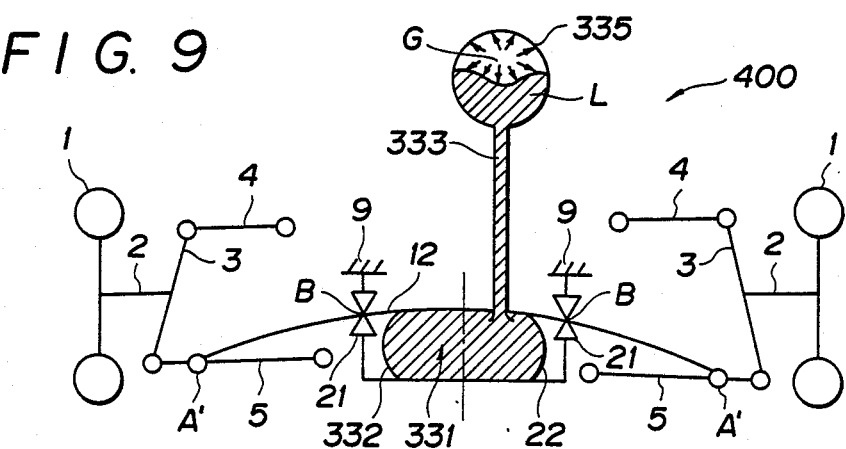
FIG. 9 is a schematic front elevational view of a suspension device according to a fourth embodiment of the present invention.

FIG. 9 schematically shows a suspension device 400 according to a fourth embodiment of the present invention. The suspension device 400 basically comprises the suspension device shown in FIG. 7 with its counteracting load mechanism 31 replaced with the counteracting load mechanism 331 shown in FIG. 8. The suspension device 400 has the advantages of the suspension device 200 shown in FIG. 7 and the advantages of the counteracting load mechanism 331 illustrated in FIG. 8.

Figure 10:
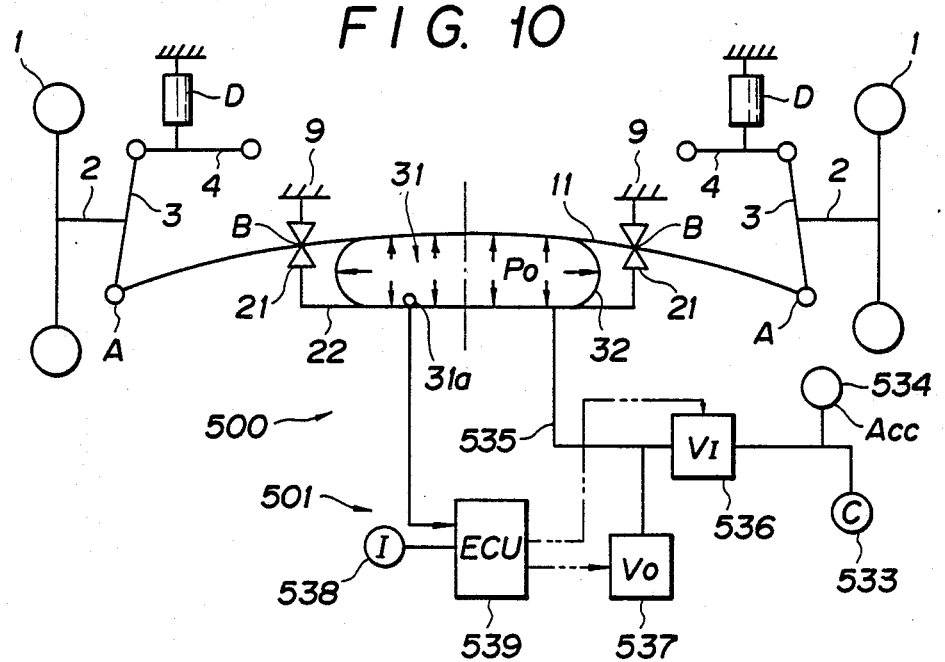
FIG. 10 is a schematic front elevational view of a suspension device according to a fifth embodiment of the present invention.
Figure 11:
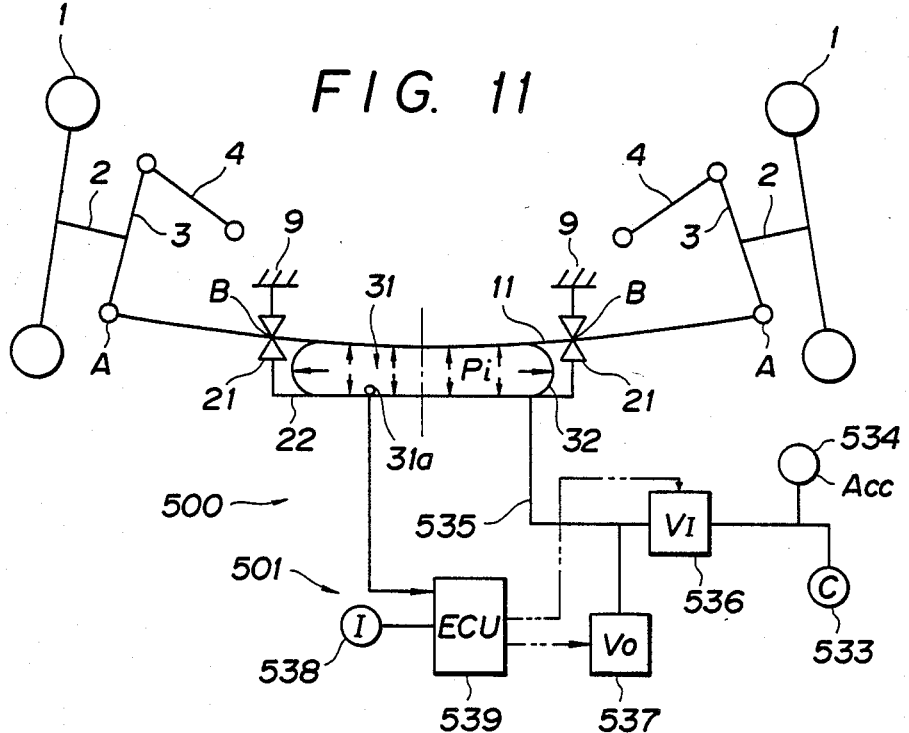
FIG. 11 is a schematic front elevational view of the suspension device of FIG. 10, showing the manner in which the suspension device operates when the wheels bump.

FIGS. 10 and 11 schematically show a suspension device 500 according to a fifth embodiment of the present invention, when the wheels are at rest and bump, respectively. The suspension device 500 comprises the suspension device 100 shown in FIG. 1 with a vehicle height adjusting mechanism 501 added.

The vehicle height adjusting mechanism 501 comprises a pressure source composed of a compressor 533 and an accumulator 534, a line 535 connecting the pressure source to the container 32, an inlet valve 536 disposed in the line 535 between the pressure source and the container 32, an outlet valve 537 by which the line 535 can be vented to atmosphere, and a controller 539 responsive to input information I from a manual control panel (not shown) and signals from a pressure sensor 31a which detects the internal pressure in the container 31 and from a vehicle height sensor (not shown), for selectively actuating the valves 536, 537.

When a manual/automatic command from the nonillustrated control panel is applied to the controller 539, the controller 539 open the inlet valve 536 and closes the outlet valve 537, whereupon a certain amount of gas under pressure is supplied into the container 32 to develop a pressure buildup therein. When the controller 539 opens the outlet valve 537 and closes the inlet valve 536, a certain amount of gas is discharged from the container 32 to reduce the internal pressure P therein.

For example, when the load weight on the vehicle is increased to reduce the vehicle height below a reference height, the gas under pressure is automatically supplied to the container 32 to increase its inner static pressure P. Or, when the vehicle is to start running over rough terrain, the gas under pressure is manually supplied to the container 32 to increase its inner static pressure P. Upon an increase in the internal pressure P of the container 32, the portion of the leaf spring 11 between the supporting points B is elevated, and hence the outer portions of the leaf spring 11 which are positioned outwardly of the supporting points B are depressed to lower the wheels 1. As a result, the vehicle height is relatively increased. Thus, when the gas under pressure is supplied into the container 32, the initial counteracting load or static counteracting load F0 produced by the counteracting load mechanism 31 is increased up to a value corresponding to the increased internal pressure P. Since the distances between the points B and the center of the leaf spring 11 are practically smaller than the distances between the points B and A, the points A are displaced downwardly over an amplified stroke by a small upward displacement of the leaf spring 11 caused by the counteracting load mechanism 31.

Irrespective of a vehicle height setting, the counteracting load mechanism 31 continuously increases the apparent spring constant K of the leaf spring 11 in proportion to the increase in the amount V of flexing of the leaf spring 11. The characteristic curve C shown in FIG. 5 is realized with a reference load weight on the vehicle and an initial reference vehicle height of the vehicle. It is assumed that the pressure in the container 32 is increased to a certain value by the vehicle height adjusting mechanism 501 until the initial counteracting load F becomes $F=f1$ in order to set the vehicle height to the reference vehicle height while the load weight is on the increase. The characteristic curve of the suspension device 500 at this time is equal to a portion of the curve C (FIG. 5) on the righthand side of the line $F=f1$, as plotted from the origin O.

The suspension device 500 offers the same advantages as those of the suspension device 100 shown in FIG. 1. Since the counteracting load mechanism 31 can be used as one component of the vehicle height adjusting mechanism 501, the vehicle height adjusting mechanism 501 is simple in structure, lightweight, and inexpensive to manufacture. These advantages manifest themselves particularly when the lower arms are in the form of a single leaf spring 11 and a single counteracting load mechanism 31 is employed, as shown.

The counteracting load mechanism 31 is constructed as the container 32 for applying the couteracting load F as an unfixed equally distributed load to the leaf spring. Therefore, the stabilizer function of the leaf spring 11 is well maintained even when the vehicle height is varied.

More specifically, where an actuator such as a hydraulic cylinder unit or the like is alternatively employed as the counteracting load mechanism and the counteracting load generated by the counteracting load mechanism is exerted as a point load on the leaf spring, the joint between the leaf spring 11 and the actuator is virtually fixed. Therefore, the portion of the leaf spring 11 between the supporting points B is also virtually fixed, and the vertical swinging movement of the leaf spring 11 at the supporing points A is effected while the leaf spring 11 is virtually fixed at the supporting points B. As a result, the mode of deformation of the leaf spring 11 after vehicle height adjustment changes from the mode of deformation thereof before vehicle height adjustment. Stated otherwise, the suspension function after vehicle height adjustment is different from that before vehicle height adjustment, and the stabilizer function is reduced. In the above embodiment, using mechanism 31, however, vertical swinging movement at the supporting points A of the leaf spring 11 when the wheels 1 bump and rebound is converted to sliding movement and angular movement of the leaf spring 11 at the supporting points B. Moreover, the counteracting load mechanism 31 includes a compressible fluid filled in a nonexpandable container 32 or a noncompressible fluid filled in an expandable container 32. Therefore, the counteracting load mechanism 31 can follow bending displacent of the leaf spring 11 between the supporting points B through the action of the pressure P in the container 32. As a consequence, even with vehicle height adjustment effected, the portion of the leaf spring 11 between the supporting points B moves substantially freely in the vertical direction. More specifically, when the wheels 1 rebound downwardly after vehicle height adjustment, the portion of the leaf spring 11 between the supporting points B is curved upwardly. The container 32 then follows such upwardly curved displacement of the leaf spring 11 under reactive forces due to the fluid pressure P in the container 32. Conversely, when the wheels 1 bump upwardly, the portion of the leaf spring 11 between the supporting points B is curved downwardly. If the container 32 is nonexpandable and the fluid filled therein is a compressible fluid, then the container 32 follows the downwardly curved displacement of the leaf spring 11 due to compressive deformation of the compressible fluid. If the container 32 is expandable and the fluid filled therein is a noncompressible fluid, then the container 32 follows the downwardly curved displacement of the leaf spring 11 due to expansive deformation of the container 32. At any rate, the leaf spring 11 is freely curved downwardly. Therefore, the mode of deformation of the leaf spring 11, even after vehicle height adjustment is effected, remains substantially the same as the mode of deformation of the leaf spring 11 when the vehicle height is not adjusted. Accordingly, irrespective of whether vehicle height adjusting is done or not, the suspension function and the stabilizer function of the suspension device are maintained.

The vehicle height may be lowered as required by adding an auxiliary counteracting means for applying a downward bending stress or load to the central portion of the leaf spring 11. The heights of the two laterally spaced suspensions can independently be adjusted by placing a plurality of bags or containers on the support plate 22 at two laterally spaced locations and independently regulating the internal pressures of the containers. Such a modification is particularly useful for leveling the vehicle body when a heavy object is placed on the vehicle transversely off the center thereof.

Figure 12:
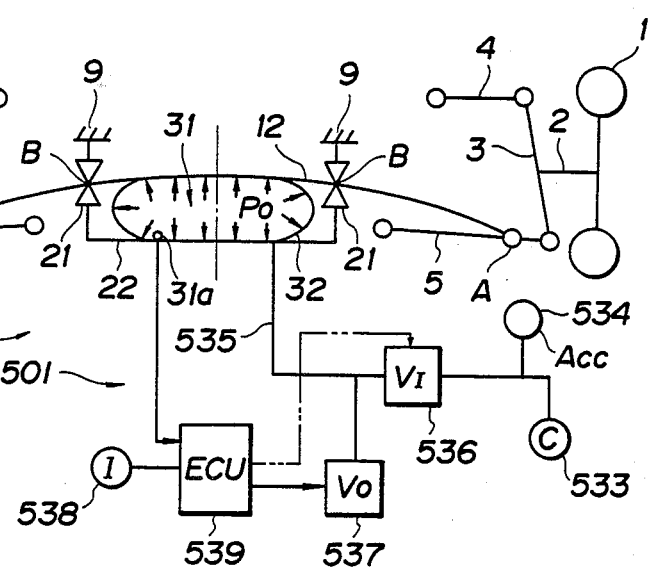
FIG. 12 is a schematic front elevational view of a suspension device according to a sixth embodiment of the present invention.

FIG. 12 schematically shows a suspension device 600 according to a sixth embodiment of the present invention. The suspension device 600 comprises the suspension device 200 shown in FIG. 7 with the vehicle height adjusting mechanism 501 of FIG. 10 added thereto.

The suspension device 600 offers the same advantages as those of the suspension device 200 shown in FIG. 7 and also the same advantages as those of the vehicle height adjusting mechanism 501 shown in FIG. 10.

It is also possible to adjust the height of the vehicle by employing the counteracting load mechanism 331 shown illustrated in FIG. 8.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A suspension device in a motor vehicle having a road wheel and a vehicle body, comprising:
    at least one component in which vertical movement of a road wheel can be transmitted, said component being separate from a damper;
    said component comprising a resilient member having a first portion operatively coupled to said road wheel, and supported on a vehicle body at a second portion spaced from said first portion for giving vertical resiliency to said road wheel;
    said component having a section which is flexible under an external force applied to said component from said road wheel in response to vertical movement of the road wheel;
    counteracting load means for applying, to said section, a counteracting load which is variable dependent on an amount of flexing of said section; and
    a rate of an increase in said counteracting load of said counteracting load means to an increase in said external force from said road wheel is variable.

2. A suspension device according to claim 1, wherein said counteracting load of said counteracting load means is progressively increased with an increase in the amount of flexing of said section, so that an apparent spring constant of said component is increased in proportion to said increase in the amount of flexing of said section.

3. A suspension device according to claim 1, wherein said counteracting load of said counteracting load means is increased in proportion to an increase in the external force applied to said component from said road wheel so that an apparent spring constant of said component is varied at a prescribed rate.

4. A suspension device according to claim 1, wherein said counteracting load means applies said counteracting load to said component in a direction opposite to the direction in which said road wheel exerts the external force on said component when the road wheel bumps it vertically moves.

5. A suspension device according to claim 1, wherein said counteracting load means comprises a container operatively interposed between said section of said component and said vehicle body, and a fluid filled in said container.

6. A suspension device according to claim 5, wherein said container of said counteracting load means is made of a nonexpandable material, and said fluid comprises a compressible fluid.

7. A suspension device according to claim 3, wherein said container is held between the section of the component and the vehicle body in an unconnected relationship to at least one of said section and said vehicle body.

8. A suspension device according to claim 5, wherein said container of said counteracting load means is made of an expandable material, and said fluid comprises a noncompressible fluid.

9. A suspension device according to claim 5, wherein said counteracting load means further comprises an auxiliary tank mounted on said vehicle body and communicating with said container.

10. A suspension device according to claim 9, wherein said counteracting load means further comprises a joint tube through which said container communicates with said auxiliary tank and which presents resistance to the flow of said fluid therethrough.

11. A suspension device according to claim 1, wherein said component comprises a leaf spring extending transversely of the motor vehicle, said leaf spring having an outer end operatively coupled to said road wheel and is supported on said vehicle body at a position spaced from said outer end, and wherein said counteracting load means is interposed between a portion of the leaf spring which is positioned inwardly of said position in the transverse direction of said motor vehicle, and a portion of said vehicle body which is positioned downwardly of said portion of the leaf spring.

12. A suspension device according to claim 1, wherein said motor vehicle has two laterally spaced road wheels; said suspension device comprising two laterally space suspensions supporting said road wheels, respectively;
each of said suspensions comprising a support member by which one of said road wheels is supported, and an upper arm and a lower arm which have outer ends supporting said support member.

13. A suspension device according to claim 12, wherein said component comprises a single elongate leaf spring extending transversely of the motor vehicle, said elongate leaf spring comprising the lower arms of said suspensions.

14. A suspension device according to claim 12, wherein said component comprises an elongate leaf spring extending transversely of the motor Vehicle and having outer ends coupled to said lower arms of said suspensions respectively.

15. A suspension device according to claim 1, further including a vehicle weight adjusting mechanism operatively coupled to said counteracting load means for varying a static counteracting load of said counteracting load means when said motor vehicle is at rest, to thereby vertically displace said section for adjusting the height of the motor vehicle.

16. A suspension device according to claim 15, wherein said counteracting load means is capable of freely following vertical flexing movement of said section of said component.

* * * * *

UNITED STATES PATENT AND TRADEMARK OFFICE
CERTIFICATE OF CORRECTION

PATENT NO. : 4,903,984

DATED : February 27, 1990

INVENTOR(S) : Hajime Kajiwara et al.

It is certified that error appears in the above-identified patent and that said Letters Patent is hereby corrected as shown below:

Column 1, line 42, change "vhicle" to --vehicle--;
    line 48, after "solve" insert a comma; after "simple" insert a comma; after "manner" insert a comma;
    line 64, change "wheel component being" to --wheel. The component is--;
    line 65, delete the comma.
Column 2, line 5, after "applies" insert a comma;
    line 63, after "1" insert a comma.
Column 3, line 27, after "support" insert --plate--;
    line 29, after "support" insert --plate--;
    line 60, after "stress" insert --or--.
Column 4, line 33, change "consant" to --constant--;
    line 63, move "(4')" to the righthand margin.
Column 5, line 39, delete the period;
    line 67, change "(: F=2.f1)," to --(: F=2•f1),--; change "(: F=3. f1)" to --(: F=3•f1)--.
Column 6, line 4, change "(')" to --(1)--;
    line 29, change "consant" to --constant--;
    line 55, change "is" to --are--;
    line 56, change "is" to --are--.
Column 7, line 41, change "leaf oil" to --coil--.
Column 8, line 6, change "th" to --the--;
    line 12, change "Containers" to --containers--;
    line 20, after "types" insert a comma;
    line 27, after "i.e." insert a comma;
    line 48, after "arms" insert --5--; change "suspension" to --suspensions--;
    lines 48 and 49, delete "in-seams";
    line 49, delete "constructed as";
    line 50, delete "a"; after "12" insert a comma;
    line 51, after "spring" insert --11--; delete "is"; before the period insert --functions directly as the lower arm of the suspensions--.

UNITED STATES PATENT AND TRADEMARK OFFICE
CERTIFICATE OF CORRECTION

PATENT NO. : 4,903,984

DATED : February 27, 1990

INVENTOR(S) : Hajime KAJIWARA et al.

It is certified that error appears in the above-identified patent and that said Letters Patent is hereby corrected as shown below:

Column 9, line 18, change "no" to --not--;
        line 22, change "provide" to --provides--;
        lines 31 and 32, change "functions directly as the lower arms of the suspensions" to --or with a combination of a compressible fluid (gas) and a noncompressible fluid (liquid)--;
        line 62, change "open" to --opens--.
Column 10, line 11, change "positined" to --positioned--.
Column 11, line 15, change "displacent" to --displacement--.
Column 12, line 17 (Claim 1, line 3), change "in" to --to--;
        lines 52 and 53 (Claim 4, lines 5 and 6), change "bumps it vertically moves" to --is vertically moved--;
        line 63 (Claim 7, line 1), change "3" to --5--.
Column 14, line 1 (Claim 12, line 4), change "space" to --spaced--;
        line 15 (Claim 14, line 3), change "Vehicle" to --vehicle--;
        line 17 (Claim 14, line 5), after "suspensions" insert a comma;
        line 19 (Claim 15, line 2), change "weight" to --height--.

Signed and Sealed this

Twenty-second Day of October, 1991

*Attest:*

HARRY F. MANBECK, JR.

*Attesting Officer*        *Commissioner of Patents and Trademarks*